United States Patent
Wang et al.

(10) Patent No.: US 8,625,241 B2
(45) Date of Patent: Jan. 7, 2014

(54) VIDEO APPARATUS AND VIDEO CIRCUIT FOR IMPROVING VIDEO SIGNAL QUALITY

(75) Inventors: Tao Wang, Shenzhen (CN); Kuo-Pin Lin, New Taipei (TW)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/598,648

(22) Filed: Aug. 30, 2012

(65) Prior Publication Data

US 2013/0271663 A1  Oct. 17, 2013

(30) Foreign Application Priority Data

Apr. 13, 2012  (CN) .......................... 2012 1 0107557

(51) Int. Cl.
  *H02H 3/08* (2006.01)
  *H02H 3/02* (2006.01)
  *G03B 21/14* (2006.01)

(52) U.S. Cl.
  USPC .............. 361/87; 361/93.1; 345/212

(58) Field of Classification Search
  USPC .................... 361/78, 87, 93.1, 100, 101, 150;
  345/211, 212; 348/380, 706, 607, 553,
  348/554, 558, 643, 644
  See application file for complete search history.

(56) References Cited

U.S. PATENT DOCUMENTS

| | | | | |
|---|---|---|---|---|
| 4,253,108 | A * | 2/1981 | Engel ............................ | 348/644 |
| 5,119,177 | A * | 6/1992 | Lim ............................. | 348/557 |
| 5,900,913 | A * | 5/1999 | Tults ............................ | 348/468 |
| 6,233,162 | B1 * | 5/2001 | Pistemaa et al. ........... | 363/21.13 |
| 6,414,694 | B1 * | 7/2002 | Byun ............................ | 345/698 |
| 6,556,412 | B1 * | 4/2003 | Oh et al. ....................... | 361/150 |
| 6,563,496 | B1 * | 5/2003 | Sakurai ........................ | 348/379 |
| 7,236,213 | B2 * | 6/2007 | Hoshino ....................... | 348/730 |
| 7,605,873 | B2 * | 10/2009 | Tseng et al. .................. | 348/729 |
| 2004/0196271 | A1 * | 10/2004 | Kaneyasu ..................... | 345/204 |
| 2005/0048960 | A1 * | 3/2005 | Yamauchi et al. ............ | 455/418 |
| 2006/0004266 | A1 * | 1/2006 | Shirai et al. .................. | 600/300 |
| 2006/0020891 | A1 * | 1/2006 | Obara et al. .................. | 715/718 |
| 2006/0097955 | A1 * | 5/2006 | Kato ............................. | 345/1.1 |

* cited by examiner

*Primary Examiner* — Victor Kostak
(74) *Attorney, Agent, or Firm* — Altis Law Group, Inc.

(57) ABSTRACT

A video circuit employed in a video apparatus is configured for transmitting a video signal via an interface unit. The video circuit includes a display circuit and a compensation circuit. The display circuit switches the video apparatus into a video input mode in response to a user's operation, and blocks specific component of the video signal received from the interface unit. The compensation circuit adds a predetermined amount of direct current to the video signal.

10 Claims, 3 Drawing Sheets

VIDEO APPARATUS AND VIDEO CIRCUIT FOR IMPROVING VIDEO SIGNAL QUALITY

BACKGROUND

1. Technical Field

The present disclosure relates to video apparatus, and particularly to a video apparatus and a video circuit for improving video signal quality.

2. Description of the Related Art

Referring to FIG. 1, a video apparatus 10 of related art includes a video switcher 11, a interface unit 12, a display screen 13, a capacitor EC, a resistor R38, a resistor R41, a capacitor C40, and a video driver 14. When the apparatus 10 generates a video signal in response to a user's switching to the video switcher 11, the direct current component of the video signal is filtered by the capacitor EC, and the alternating current component of the video signal flows to the video switcher 11. A permitted voltage range of the video switcher 11 is predetermined to be 0 V-3.3 V. Thus, the alternating current whose amplitude is larger than 0 flows to the video driver 14 through the video switcher 11, and the alternating whose amplitude is lower than 0 is filtered by the capacitor EC. Therefore, the video image displayed on the display screen 13 is distorted. Thus a new video apparatus and video circuit is desired.

BRIEF DESCRIPTION OF THE DRAWINGS

The components in the drawings are not necessarily drawn to scale, the emphasis instead being placed upon clearly illustrating the principles of the disclosure. Moreover, in the drawing, like reference numerals designate corresponding parts throughout the several views.

DETAILED DESCRIPTION

Figure 1:
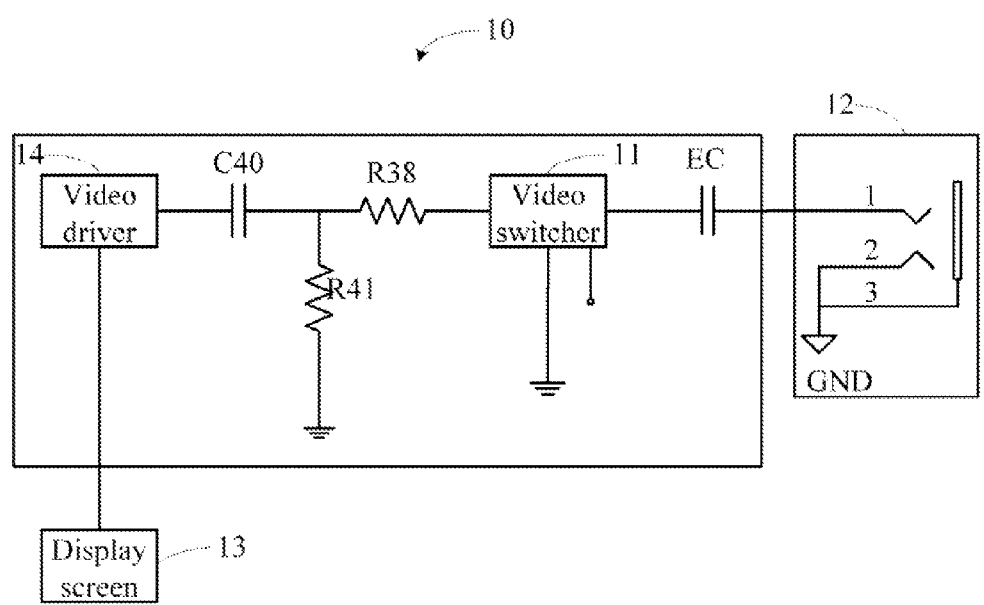
FIG. 1 is a circuit diagram of a video apparatus of related art.
Figure 2:
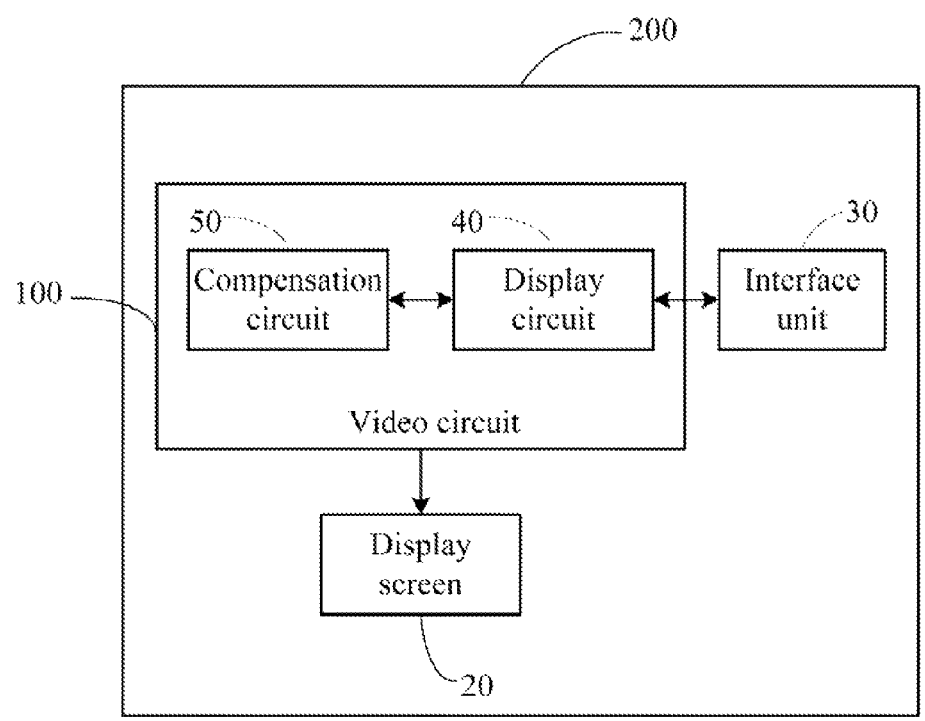
FIG. 2 is a block diagram of a video apparatus in accordance with an exemplary embodiment.

Referring to FIG. 2, a video apparatus 200 includes a video circuit 100, a display screen 20, and an interface unit 30. The video circuit 100 is connected between the interface unit 30 and the display screen 20. The video circuit 100 inputs or outputs video signals via the interface unit 30, and displays a video image on the display screen 20 according to the video signals.

The video circuit 100 includes a display circuit 40 and a compensation circuit 50. The display circuit 40 is connected between an input port and an output port of the compensation circuit 50. When the video apparatus 200 is switched into a video input mode in response to a user's operation, the display circuit 40 receives video signals via the interface unit 30 which is generated in response to the user's operation and has been filtered out some video signals. The compensation circuit 50 adds a predetermined amount of direct current to the video signal filtered by the display circuit 40 to compensate the video signals, thereby reduces the video signal distortion.

Figure 3:
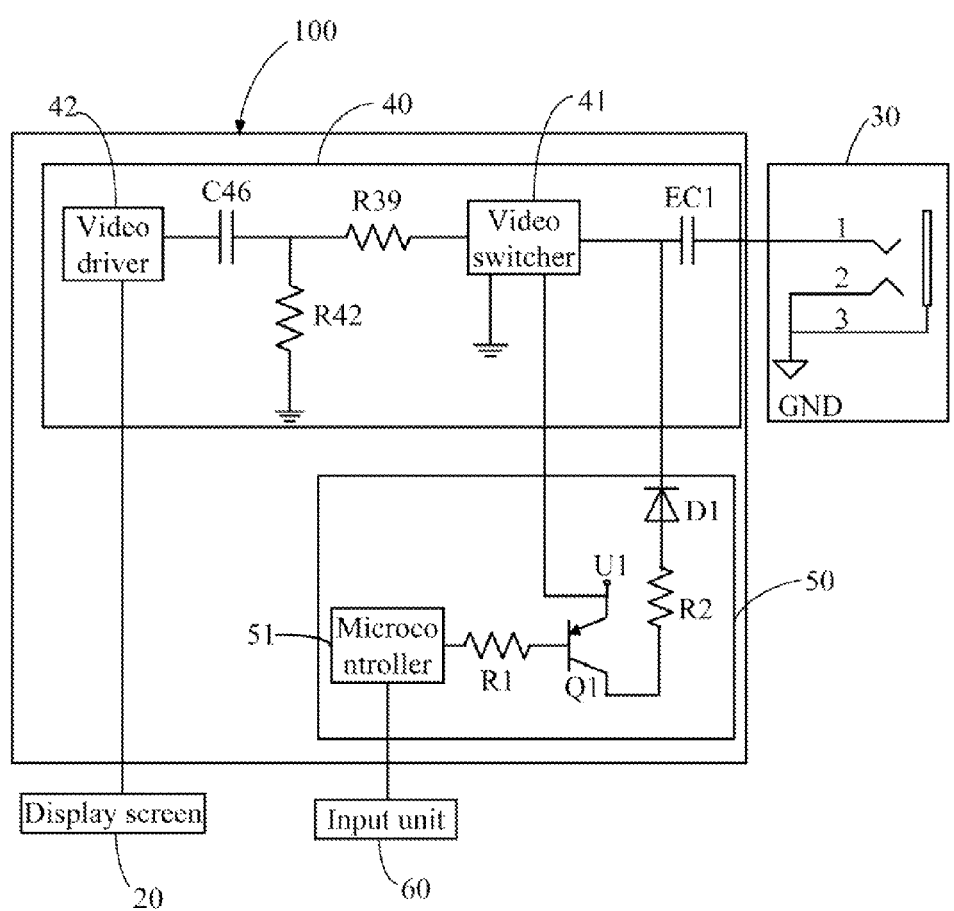
FIG. 3 is a circuit diagram of the video apparatus of FIG. 2 in accordance with an exemplary embodiment.

Referring to FIG. 3, in the embodiment, the interface unit 30 includes a first port 1, a second port 2, and a third port 3. The third port 3 is grounded, and the first port 1 is connected to the display circuit 40.

In the embodiment, the display circuit 40 includes a capacitor EC1, a video switcher 41, a resistor R39, a resistor R42, a capacitor C46, and a video driver 42. The capacitor EC1, the video switcher 41, the resistor R39, and the capacitor C46 are connected between the first port 1 and the video driver 42 in series. The resistor R42 is connected between a junction where the capacitor C46 is connected to the resistor R39 and ground.

The video switcher 41 is configured for generating a switch signal for switching the video apparatus 200 into the video mode in response to the user's operation. The video switcher 41 is connected to a power supply which provides a U1 volts, such as 3.3 V. A permitted voltage value range of the video switcher 41 is predetermined, such as 0 V-3.3 V. The direct current component of the video signal is filtered when the video signal flows through the interface unit 30 and the capacitor EC1, and the alternating current component of the video signal flows to the video switcher 41. The video switcher 41 blocks the alternating current whose voltage values do not fall in the permitted voltage range of the video switcher 41. For example, the alternated current whose amplitude is greater than 0 flows to the video driver 42 through the video switcher 41 via the resistor R39 and the capacitor C46, and the alternated current whose amplitude is smaller than 0 is blocked by the video switcher 41.

In the embodiment, the compensation circuit 50 includes a microcontroller 51, a resistor R1, a triode Q1, a resistor R2, and a diode D1. The emitter of the triode Q1 is connected to an output port (not shown) of the video switcher 41, the base of the triode Q1 is connected to the microcontroller 51, and the collector of the triode Q1 is connected to an input port of the video switcher 41 via the resistor R2 and the diode D1.

The microcontroller 51 generates a signal in response to a video mode switch signal generated by the user's operation on an input unit 60 to turn on the triode Q1 via the resistor R1. Thereby, an amount of direct current UV calculated by a formula is put into the video switcher 41. The formula is: $UV = (U1 - UD) \times (R39 + R42)/(R2 + R39 + R42)$. UD is the voltage value of the diode D1.

The compensation circuit 50 adds the direct current value UV to the video signal flowing through the video switcher 41, and the video signal compensated by the compensation circuit 50 flows to the video driver 42 via the capacitor C46. The video driver 42 generates a signal according to the compensated video signal, and displays a corresponding video image on the display screen 20 according to the signal.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A video apparatus comprising:
    an interface unit configured for transmitting a video signal;
    a display screen configured for displaying a video image corresponding to the video signal;
    a video circuit connected between the display screen and the interface unit, wherein the video circuit comprising:
        a display circuit configured for switching the video apparatus to a video input mode in response to a user's operation, receiving the video signal transmitted from the interface unit, and further blocking specific component of the video signal; and
        a compensation circuit connected to the display circuit, configured for adding a predetermined amount of direct current to the video signal;
    wherein the display circuit comprises a video switcher connected to a power supply, configured for switching the video apparatus into the video input mode in response to the user's operation, wherein the video switcher has a predetermined permitted voltage range, the display circuit further comprises a first capacitor, a first resistor, a second resistor, a second capacitor, and a video driver, the first capacitor, the video switcher, a first resistor, and a second capacitor are connected between the interface unit and the video deriver in serial, and the second resistor is connected to a junction where the second resistor is connected to the second capacitor and ground.

2. The video apparatus as claimed in claim 1, wherein the compensation circuit comprises a microcontroller, a triode, a third resistor, a fourth resistor, and a diode, the emitter of the triode is connected to an output port of the video switcher, the base of the triode is connected to the microcontroller via the third resistor, and the collector of the triode is connected to an input port of the video switcher via the fourth resistor and the diode.

3. The video apparatus as claimed in claim 2, wherein a direct current voltage UV is applied to the video switcher, the voltage UV is calculated by a formula: $UV=(U1-UD)*(R39+R42)/(R2+R39+R42)$, wherein UD is a voltage value of the diode, U1 is voltage provided by the power supply, R39 is the first resistor, R42 is the second resistor, R2 is the fourth resistor.

4. A video circuit configured for connecting between a display unit and an interface unit, wherein the video circuit comprising:
a display circuit configured for switching the display unit to a video input mode in response to a user's operation, receiving a video signal from the interface unit, and further blocking specific component of the video signal; and
a compensation circuit connected to the display circuit, configured for adding a predetermined amount of direct current to the video signal;
wherein the display circuit comprises a video switcher connected to a power supply, configured for switching the display unit to the video input mode in response to the user's operation, wherein the video switcher has a predetermined permitted voltage range; the display circuit further comprises a first capacitor, a first resistor, a second resistor, a second capacitor, and a video driver, the first capacitor, the video switcher, a first resistor, and a second capacitor are connected between the interface unit and the video deriver in serial, and the second resistor is connected to a junction where the second resistor is connected to the second capacitor and ground.

5. The video circuit as claimed in claim 4, wherein the compensation circuit comprises a microcontroller, a triode, a third resistor, a fourth resistor, and a diode, the emitter of the triode is connected to an output port of the video switcher, the base of the triode is connected to the microcontroller via the third resistor, and the collector of the triode is connected to an input port of the video switcher via the fourth resistor and the diode.

6. The video circuit as claimed in claim 5, wherein an mount of direct current at voltage UV is input into the video switcher, the voltage NV of the direct current is calculated by a formula: $UV=(U1-UD)*(R39+R42)/(R2+R39+R42)$, wherein UD is a voltage value of the diode, U1 is voltage provided by the power supply, R39 is the first resistor, R42 is the second resistor, R2 is the fourth resistor.

7. A video apparatus comprising:
an interface unit configured for transmitting a video signal;
a display screen configured for displaying a video image corresponding to the video signal;
a video circuit connected between the display screen and the interface unit, wherein the video circuit comprising:
a display circuit configured for switching the video apparatus to a video input mode in response to a user's operation, receiving the video signal transmitted from the interface unit, and further blocking specific component of the video signal; and
a compensation circuit connected to the display circuit, configured for adding a predetermined amount of direct current to the video signal;
wherein the display circuit further comprises a first capacitor, a first resistor, a second resistor, a second capacitor, and a video driver, the first capacitor, the video switcher, a first resistor, and a second capacitor are connected between the interface unit and the video deriver in serial, and the second resistor is connected to a junction where the second resistor is connected to the second capacitor and ground.

8. The video apparatus as claimed in claim 7, wherein the display circuit comprises a video switcher connected to a power supply, configured for switching the video apparatus into the video input mode in response to the user's operation, wherein the video switcher has a predetermined permitted voltage range.

9. The video circuit as claimed in claim 8, wherein the compensation circuit comprises a microcontroller, a triode, a third resistor, a fourth resistor, and a diode, the emitter of the triode is connected to an output port of the video switcher, the base of the triode is connected to the microcontroller via the third resistor, and the collector of the triode is connected to an input port of the video switcher via the fourth resistor and the diode.

10. The video circuit as claimed in claim 9, wherein an mount of direct current at voltage UV is input into the video switcher, the voltage NV of the direct current is calculated by a formula: $UV=(U1-UD)*(R39+R42)/(R2+R39+R42)$, wherein UD is a voltage value of the diode, U1 is voltage provided by the power supply, R39 is the first resistor, R42 is the second resistor, R2 is the fourth resistor.

* * * * *